(12) United States Patent
Brunet

(10) Patent No.: US 7,657,624 B2
(45) Date of Patent: Feb. 2, 2010

(54) NETWORK USAGE MANAGEMENT SYSTEM AND METHOD

(75) Inventor: Xavier Brunet, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 650 days.

(21) Appl. No.: 11/158,784

(22) Filed: Jun. 22, 2005

(65) Prior Publication Data

US 2006/0294148 A1 Dec. 28, 2006

(51) Int. Cl.
*G06F 15/16* (2006.01)
(52) U.S. Cl. .......................... 709/224; 707/10
(58) Field of Classification Search ......... 709/200–202, 709/220–227; 707/10
See application file for complete search history.

(56) References Cited

U.S. PATENT DOCUMENTS

| | | | |
|---|---|---|---|
| 5,592,620 A | 1/1997 | Chen et al. | |
| 5,634,009 A | 5/1997 | Iddon et al. | |
| 5,737,600 A | 4/1998 | Geiner et al. | |
| 5,778,350 A | 7/1998 | Adams et al. | |
| 5,878,420 A | 3/1999 | De La Salle | |
| 5,892,917 A | 4/1999 | Myerson | |
| 5,978,780 A | 11/1999 | Watson | |
| 6,052,447 A | 4/2000 | Golden et al. | |
| 6,151,601 A | 11/2000 | Papierniak et al. | |
| 6,173,418 B1 | 1/2001 | Fujino et al. | |
| 6,381,306 B1 | 4/2002 | Lawson et al. | |
| 6,658,470 B1 | 12/2003 | DeBardelaben | |
| 6,662,176 B2 | 12/2003 | Brunet et al. | |
| 6,751,663 B1 * | 6/2004 | Farrell et al. | 709/224 |
| 6,823,385 B2 * | 11/2004 | McKinnon et al. | 709/226 |
| 7,184,398 B2 * | 2/2007 | McKinnon et al. | 370/230 |
| 7,197,560 B2 * | 3/2007 | Caslin et al. | 709/224 |
| 7,222,190 B2 * | 5/2007 | Klinker et al. | 709/238 |
| 7,243,143 B1 * | 7/2007 | Bullard | 709/223 |
| 7,274,667 B2 * | 9/2007 | McKinnon et al. | 370/234 |
| 2002/0002688 A1 * | 1/2002 | Gregg et al. | 713/202 |
| 2002/0032769 A1 | 3/2002 | Barkai et al. | |
| 2002/0091636 A1 * | 7/2002 | Bullard et al | 705/40 |
| 2002/0129143 A1 * | 9/2002 | McKinnon et al. | 709/225 |
| 2002/0143911 A1 * | 10/2002 | Vicente et al. | 709/223 |
| 2002/0169792 A1 | 11/2002 | Perinet et al. | |
| 2003/0014521 A1 | 1/2003 | Elson et al. | |
| 2003/0110252 A1 | 6/2003 | Yang-Huffman | |
| 2003/0115316 A1 | 6/2003 | Yang-Huffman | |
| 2004/0039809 A1 | 2/2004 | Ranous et al. | |
| 2004/0255160 A1 | 12/2004 | Stamos et al. | |
| 2007/0140128 A1 * | 6/2007 | Klinker et al. | 370/238 |
| 2008/0037578 A1 * | 2/2008 | Carlson et al. | 370/463 |

FOREIGN PATENT DOCUMENTS

| | | |
|---|---|---|
| EP | 0495289 | 10/1996 |
| EP | 0920155 | 6/1999 |

* cited by examiner

*Primary Examiner*—Moustafa M Meky

(57) ABSTRACT

A network usage management system comprises at least one collector adapted to collect network usage data associated with a data source using a network, the at least one collector adapted to generate log data associated with the at least one collector. The network usage management system also comprises at least one log collector adapted to retrieve the log data from the at least one collector.

35 Claims, 3 Drawing Sheets

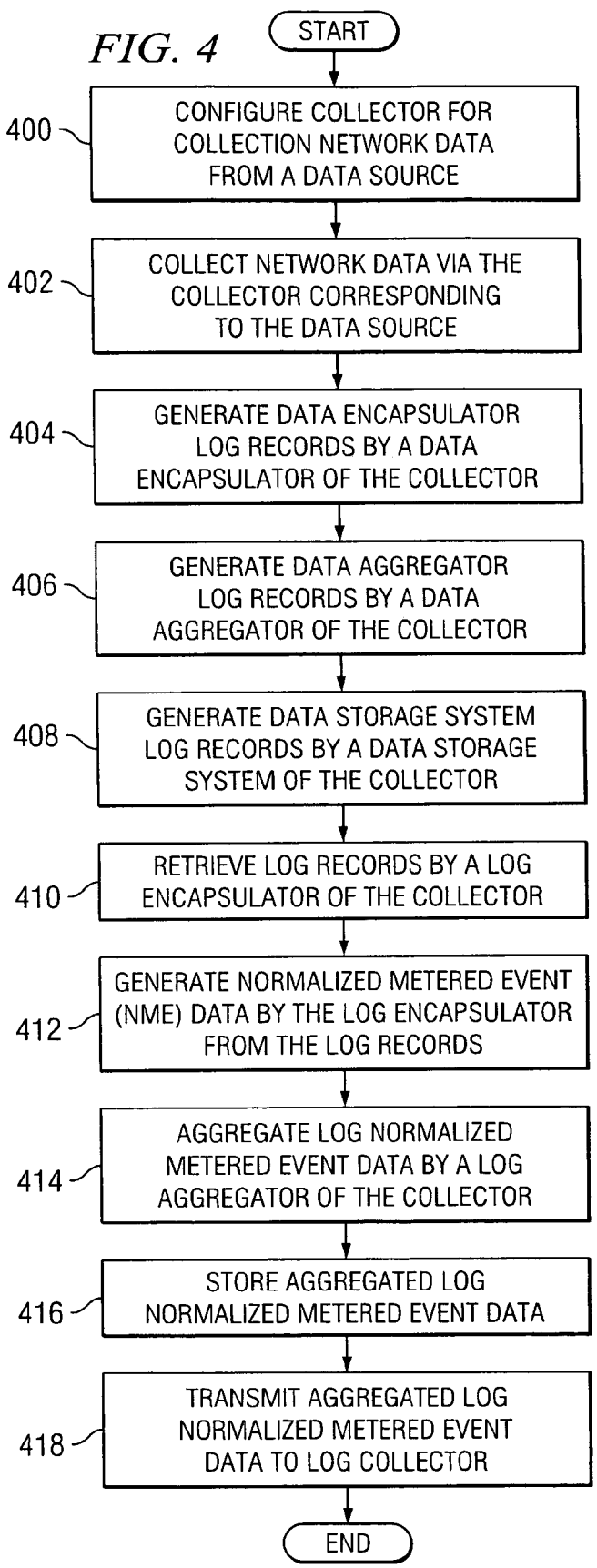

NETWORK USAGE MANAGEMENT SYSTEM AND METHOD

BACKGROUND OF THE INVENTION

Internet usage management (IUM) systems generally comprise a plurality of distributed resources (e.g., "collectors") used to collect, transform and store data corresponding to a variety of types of network data sources (e.g., information associated with telephone usage, web access monitoring and data upload/download transfers). In some instances, the collected data is used to support billing and other business-based applications. However, because of the distributed nature of the data-collecting resources, troubleshooting, debugging and/or other types of management operations corresponding to such resources is time-consuming and troublesome.

BRIEF DESCRIPTION OF THE DRAWINGS

For a more complete understanding of the present invention and the advantages thereof, reference is now made to the following descriptions taken in connection with the accompanying drawings in which:

FIG. 4 is a flow diagram illustrating an embodiment of a network usage management method in accordance with the present invention.

DETAILED DESCRIPTION OF THE DRAWINGS

The preferred embodiments of the present invention and the advantages thereof are best understood by referring to FIGS. 1-4 of the drawings, like numerals being used for like and corresponding parts of the various drawings.

Figure 1:
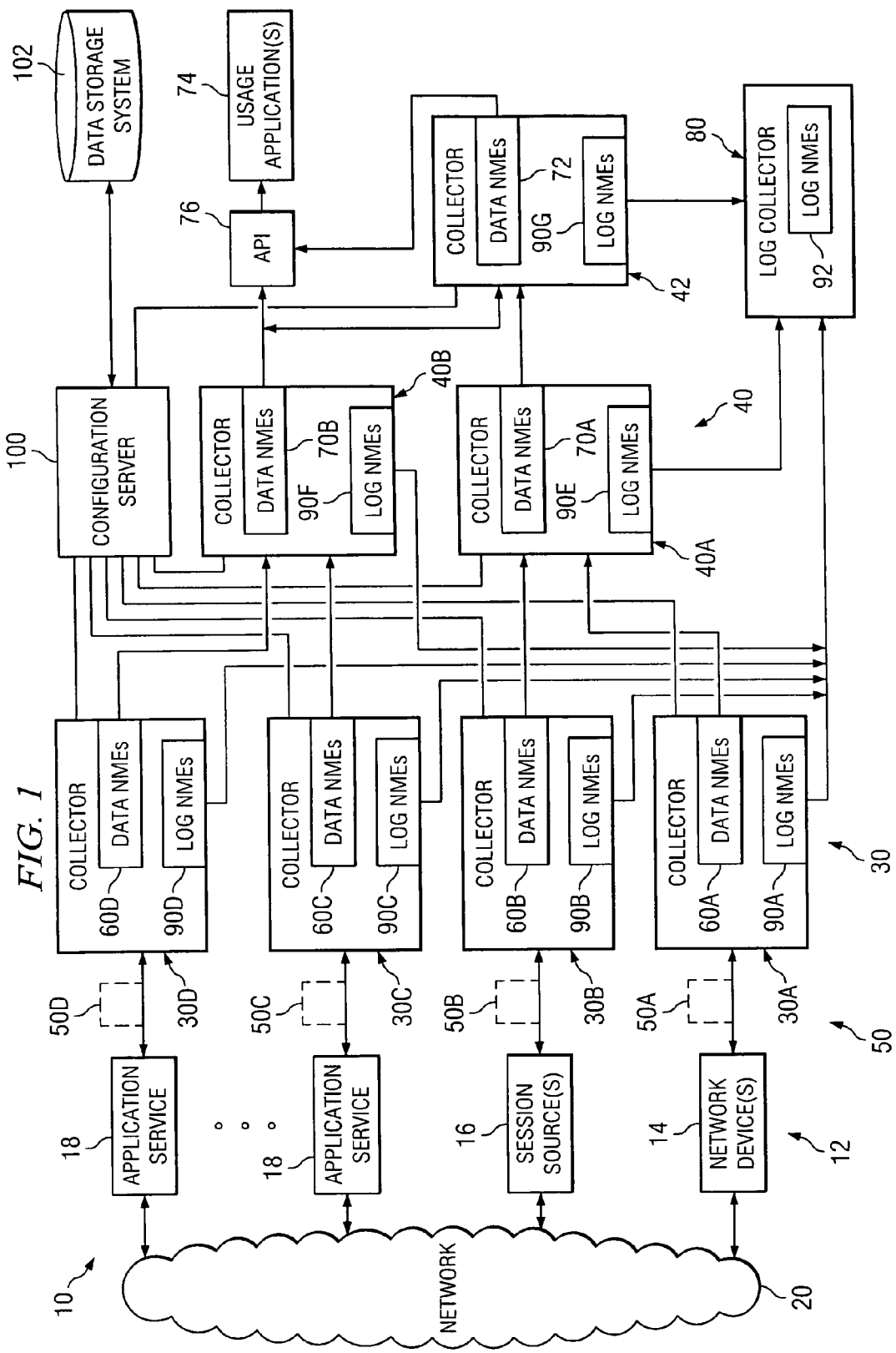
FIG. 1 is a diagram illustrating an embodiment of a network usage management system in accordance with the present invention.

FIG. 1 is a diagram illustrating an embodiment of a network usage management system 10 in accordance with the present invention. System 10 provides a system and method which employs batch, real-time and/or near real-time correlation of data from a plurality of different, independent data sources 12. In the embodiment illustrated in FIG. 1, data sources 12 comprises network device(s) 14, session source(s) 16 and application service(s) 18 which are each communicatively couplable to a network 20. Network device(s) 14 may comprise devices such as, but not limited to, routers, switches and/or simple network management protocol (SNMP)-capable devices. Session source(s) 16 may comprise authentication servers, accounting servers and/or Radius-capable servers. Application service(s) 18 may comprises streaming servers, web servers and/or mail servers. However, it should be understood that other types of data sources 12 may also be used in system 10. Network 20 may comprise the Internet, an intranet, a local area network (LAN), a wide area network (WAN) or other type of communication network structure.

In the embodiment illustrated in FIG. 1, system 10 comprises collectors 30 communicatively couplable to data sources 12. For example, in the embodiment illustrated in FIG. 1, collector 30A is communicatively couplable to one or more network devices 14, collector 30B is communicatively couplable to one or more session sources 16 and collectors 30C and 30D are communicatively couplable to one or more application services 18. However, it should be understood that a greater or fewer quantity of collectors 30 may be utilized in system 10. Further, it should be understood that any particular collector 30 may be configured to receive information from a single type of data source 12 or different types of data sources 12. In the embodiment illustrated in FIG. 1, system 10 also comprises collectors 40 and 42. For example, collector 40A is communicatively couplable to collectors 30A and 30B, and collector 40B is communicatively couplable to collectors 30C and 30D. Further, collector 42 is communicatively couplable to collectors 40A and 40B. Collectors 30, 40 and 42 may comprise software, hardware, or a combination of hardware and software. In the embodiment illustrated in FIG. 1, three levels of collectors are illustrated (e.g., data collectors 30 at level one, data collectors 40 at level two, and data collector 42 at level three). However, it should be understood that a greater or fewer quantity of levels of collectors may be utilized and their inputs/outputs otherwise coupled and/or configured. Further, it should be understood that collectors may be configured or otherwise coupled without any identifiable hierarchy. Preferably, collectors 30, 40 and 42 are disposed in a distributed environment each residing and/or otherwise operating on a separate server or platform. However, it should be understood that multiple collectors may be configured to operate from a single platform.

In operation, collectors 30 receive network data 50 from data sources 12. Network data 50 comprises network usage information records or events. For example, collector 30A receives network data 50A from network device(s) 14, collector 30B receives network data 50B from session source(s) 16, and collectors 30C and 30D receive network data 50C and 50D, respectively, from application service(s) 18. Network data 50 comprises a set of network usage information records of events. Collectors 30 convert the network data 50 to a standard data format usable by the collectors 30, 40 and 42. Preferably, the standard data format is a normalized metered event (NME). NMEs are made up of attributes such as a usage records start time, end time, source Internet protocol (IP) address, destination IP address, number of bytes transferred, a user's login ID and account number, etc. Collector 30A stores the network data 50A associated with network device(s) 14 as a set of NMEs 60A, collector 30B stores the network data 50B associated with session source(s) 16 as a set of NMEs 60B, and collectors 30C and 30D store the network data 50C and 50D associated with application service(s) 18 as a set of NMEs 60C and 60D, respectively.

The set(s) of NMEs 60 are read by and/or otherwise transferred from collector(s) 30 to collector(s) 40. Preferably, collector(s) 40 query and/or otherwise poll collector(s) 30 to request and/or otherwise retrieve NMEs 60. Collectors 40 correlate the sets of NMEs 60 to define a set of correlated NME data 70. For example, collector 40A receives NMEs 60A and 60B from respective collectors 30A and 30B and correlates the NMEs 60A and 60B to define a set of correlated NMEs 70A, and collector 40B receives NMEs 60C and 60D from respective collectors 30C and 30D and correlates the NMEs 60C and 60D to define a set of correlated NMEs 70B. Further collector 42 receives NMEs 70A and 70B from respective collectors 40A and 40B and correlates the NMEs 70A and 70B to define a set of correlated NMEs 72. In some embodiments of the present invention, data correlation is performed as a batch process. As such, the data does not have to be correlated in real-time or near real-time (i.e., as the data is collected). Data collection and/or correlation may be performed at a desired time or time interval(s). Thus, because data collection and/or correlation need not be performed in real-time or near real-time, collectors 30 continue to collect, process and store data independent of the correlation process of collectors 40 and/or 42. Collector 40B and/or 42 converts the correlated data to a data format usable by usage application(s) 74 and transfers such information to usage application(s) 74 via an application program interface (API) 76. However, it should be understood that other collectors may be configured to output data directly to usage application(s) 74. For example, in the embodiment illustrated in FIG. 1, collector 40B converts the correlated data to a data format usable by usage application(s) 74 and outputs all or a portion of such data to usage application(s) 74 via API 76. Usage application(s) 74 may comprise billing systems, strategic marketing, capacity planning or data mining systems.

In the embodiment illustrated in FIG. 1, system 10 also comprises a log collector 80. Log collector 80 comprises a centralized resource for receiving log data (e.g. in the form of log NMEs) from collectors 30, 40 and/or 42. For example, in operation, each component of each collector 30, 40 and 42 generates and/or otherwise writes log messages or records to a log file. In accordance with embodiments of the present invention, collectors 30, 40 and 42 generate log NMEs 90 from the log records. For example, collector 30A generates log NMEs 90A based on log messages or records generated by collector 30A. Correspondingly, collectors 30B-30D, 40A, 40B and 42 generate log NMEs 90B-90G, respectively, based on log messages or records generated by respective collector 30B-30D, 40A, 40B and 42. The log NMEs 90 are read by and/or otherwise transferred from collectors 30B-30D, 40A, 40B and 42 to log collector 80. Preferably, log collector 80 queries and/or otherwise polls collectors 30B-30D, 40A, 40B and 42 to request and/or otherwise retrieve log NMEs 90. In the embodiment illustrated in FIG. 1, log collector 80 receives log NMEs 90 from each of collectors 30B-30D, 40A, 40B and 42. However, it should be understood that log collector 80 may be configured to retrieve log NMEs from particular collectors, multiple log collectors 80 may be configured to retrieve log NMEs from various different collector sources, and/or various levels or hierarchies of log collectors 80 may be configured. Log collectors 80 correlates the various sets of NMEs 90 to define a set of correlated NME data 92. The log NMEs 92 are evaluated and/or otherwise processed to detect failures or other types of events associated with collectors 30, 40 and 42. For example, in some embodiments of the present invention, log collector 80 filters and/or merges the log NMEs 92 corresponding to origin, date, or other criteria. Log collector 80 is preferably configured similarly to collectors 30, 40 and 42 for ease of deployment and configurability. Thus, embodiments of the present invention provide a central repository (e.g., log collector 80) for log information associated with distributed network resources (e.g., collectors 30, 40 and/or 42).

In the embodiment illustrated in FIG. 1, system 10 also comprises a configuration server 100 communicatively coupled to each collector 30, 40 and 42 and log collector 80. Collectors 30, 40 and 42 and log collector 80, and components thereof, are preferably flexibly configurable via configuration server 100. Configuration information for collectors 30, 40 and 42 and log collector 80 is preferably stored at a centralized location (e.g., data storage system 102) and managed by configuration server 100. For example, in some embodiments of the present invention, at start-up, collectors 30, 40 and 42 and log collector 80 query configuration server 100 to retrieve their respective configuration. However, it should be understood that the configuring of collectors 30, 40 and 42 and log collector 80 may be otherwise performed.

Figure 2:
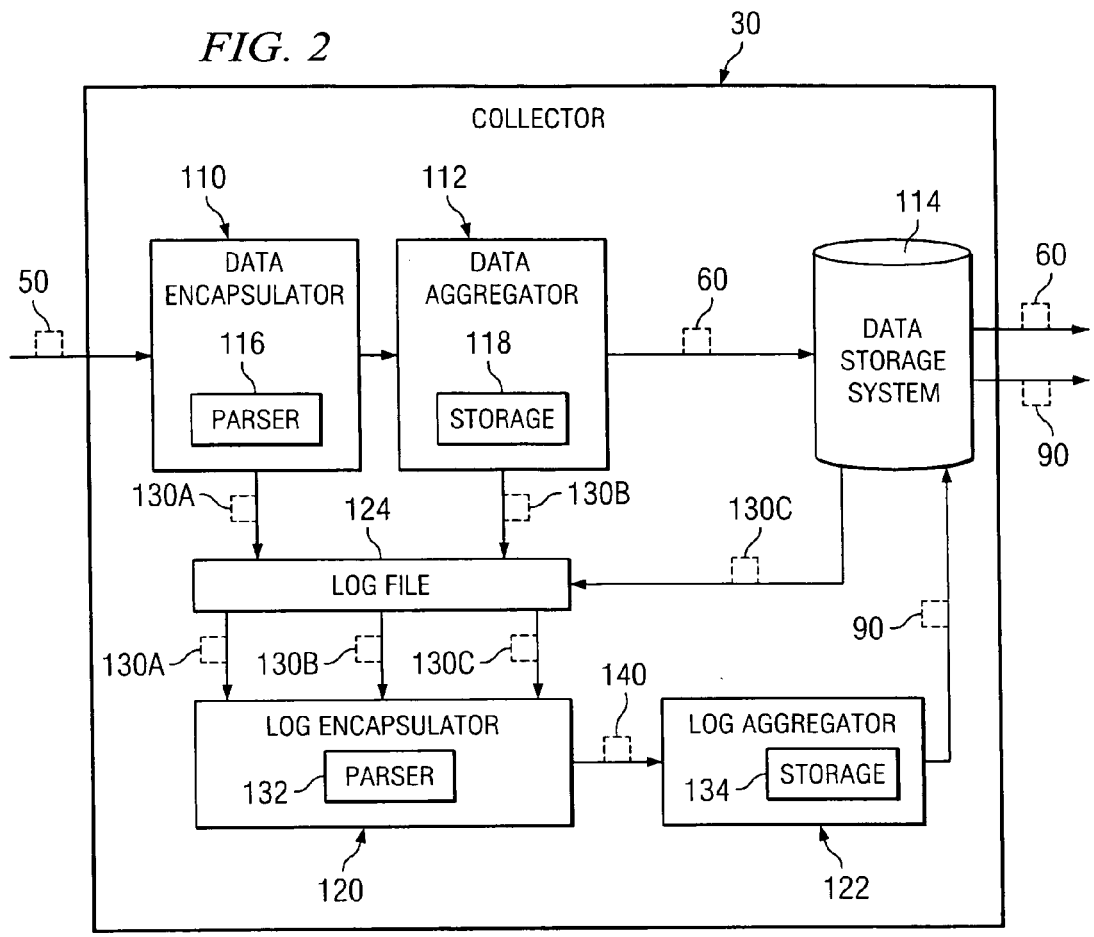
FIG. 2 is diagram illustrating an embodiment of a collector of the network usage management system illustrated in FIG. 1 in accordance with the present invention.

FIG. 2 is a diagram illustrating an embodiment of collector 30 in accordance with the present invention. However, it should be understood that collectors 40 and 42 and log collector 80 may be similarly and/or identically configured. For example, collector 30, 40 and 42 and log collector 80 are each preferably a configurable collector such that collectors 30, 40 and/or 42 and log collector 80 may be configured to operate at different system levels and/or corresponding to different types of data acquisition. In the embodiment illustrated in FIG. 2, collector 30 comprises a data encapsulator 110, a data aggregator 112 and a data storage system 114. Data encapsulator 110 receives network data 50 from respective data source(s) 12 in a data format corresponding to the respective data source(s) 12 (i.e., a raw data format). Data encapsulator 110 converts the network data 50 into a standard data format usable by a next-level element or component (e.g., collector 40). In the embodiment illustrated in FIG. 2, data encapsulator 110 comprises a parser 116 for parsing or separating out the data for converting it into fields of a standard data format. Parser 116 is configured to recognize event fields from the input source and map each one (i.e., normalize them) to an NME format. Alternatively, in some embodiments of the present invention, data encapsulator 110 may not employ a parser. Data aggregator 112 receives the NMEs from data encapsulator 110, processes and/or otherwise aggregates the NMEs, and temporarily stores the aggregated NMEs 60 in a data storage or memory location 118. For example, a single network event or action may result in the generation of multiple NMEs. Data aggregator 112 is used to aggregate the generated NMEs to capture and/or otherwise provide those NMEs of interest (e.g., filters the generated NMEs) and/or otherwise provides desired information associated with the generated NMEs (e.g., the time spent by the user on a particular web site which may be computed based on the difference of time between NMEs associated with the initiation and termination of such user session). However, it should be understood that in some embodiments, NME aggregation may be omitted (e.g., if all NMEs are of interest). The aggregated NMEs 60 are periodically "flushed" or transferred to data storage system 114 where they are read or otherwise retrieved by a next-level element or component.

In the embodiment illustrated in FIG. 2, collector 30 also comprises a log encapsulator 120 and a log aggregator 122. Log encapsulator 120 receives and/or otherwise retrieves log messages or records generated or otherwise associated with data encapsulator 110, data aggregator 112 and data storage system 114, either directly or from a log file 124, and converts the log records into NMEs. For example, in operation, in the embodiment illustrated in FIG. 2, log encapsulator 120 comprises a parser 132 for parsing or separating out the data from the log records for converting it into fields of a standard data format (e.g., NMEs 140). Log aggregator 122 receives the NMEs 140 from log encapsulator 120, aggregates the NMEs 140, and temporarily stores the aggregated NMEs 90 in a data storage or memory location 134. As discussed above, in some embodiments of the present invention, aggregation of log NMEs may be omitted. The aggregated log NMEs 90 are periodically "flushed" or transferred to data storage system 114. The log NMEs 90 are thereafter transferred and/or otherwise communicated to another system 10 resource for viewing, analysis, management or other purpose(s) (e.g., via log collector 80). Preferably, processing of log records 130A, 130B and/or 130C into log NMEs 90 and transfer of such log NMEs 90 from data storage system 114 is performed in real-time, or in near real-time, to facilitate a dynamic management environment. However, it should be understood that the processing and transfer of log NMEs 90 may be otherwise configured.

Figure 3:
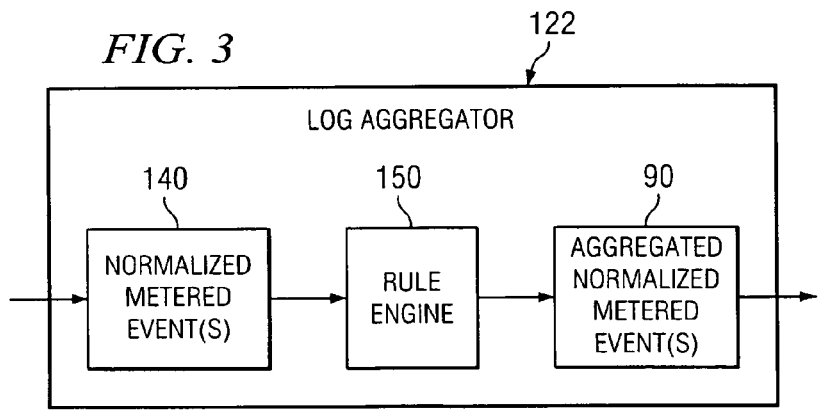
FIG. 3 is diagram illustrating an embodiment of a log aggregator of the collector illustrated in FIG. 2 in accordance with the present invention.

FIG. 3 is a diagram illustrating an embodiment of log aggregator 122 in accordance with the present invention. In the embodiment illustrated in FIG. 3, log aggregator 122 comprises a rule engine 150. A set of NMEs 140 received by log aggregator 122 are processed according to rule engine 150. Rule engine 150 processes the NMEs 140 according to a predefined aggregation scheme or a set of rules. For example, in some embodiments of the present invention, log aggregator 122 process results in a reduction in the amount of data (e.g., filters the NMEs 140 to provide NMEs of interest and/or otherwise provides information of interest associated with the genetrated NMEs). In such embodiments, each NME is stored in an aggregation tree. Log aggregator 122 creates the aggregation tree. How the nodes or branches of the aggregation tree are established depends on a set of configurable rules, termed a "rule chain." Rules in a rule chain are applied to inbound NMEs by rule engine 150. The bottom nodes or "leaf" nodes of each aggregation tree are termed aggregated NMEs. The aggregated NMEs 90 are stored in data storage system 114 (FIG. 2). Thus, log aggregator 122 correlates, combines, filters or adorns (i.e., to populate additional fields in an NME) the NMEs 140 according to a predefined rule set to generate log NMEs 90.

FIG. 4 is a flow diagram illustrating an embodiment of a network usage management method in accordance with the present invention. The method begins at block 400, where collector 30, 40 and/or 42 is configured corresponding to information contained at configuration server for collecting network data from data source(s) 12. At block 402, collector(s) 30 collect network data corresponding to respective data source(s) 12 for generating NMEs associated with network usage by such data source(s) 12. At block 404, data encapsulator(s) 110 of collector(s) 30 generate log messages or records 130A and write the log records 130A to log file 124. At block 406, data aggregator(s) 112 of collector(s) 30 generate log messages or records 130B and write the log records 130B to log file 124. At block 408, data storage system(s) 114 of collector(s) 30 generate log messages or records 130C and write the log records 130C to log file 124.

At block 410, log encapsulator 120 retrieves the log records 130A, 130B and/or 130C from log file 124. Additionally, or alternatively, log records 130A, 130B and/or 130C may be transmitted by respective data encapsulator(s) 110, data aggregator(s) 112 and data storage system(s) 114 directly to log encapsulator 120. Thus, in some embodiments of the present invention, log file 124 is omitted such that log encapsulator 120 retrieves and/or otherwise receives log records 130A, 130B and/or 130C directly from respective data encapsulator(s) 110, data aggregator(s) 112 and data storage system(s) 114. At block 412, log encapsulator 120 generates log NMEs 140 based on the log records 130A, 130B and/or 130C and transmits the log NMEs to log aggregator 122. At block 414, log aggregator 122 aggregates or processes the log NMEs 140 according to rule engine 150 to obtain aggregated log NMEs 90. At block 416, the aggregated log NMEs 90 are stored in data storage system 114. At block 418, the log NMEs 90 are transmitted or otherwise communicated to another network component such as log collector 80.

Thus, embodiments of the present invention provide a centralized resource (e.g., log collector 80) to facilitate easier accessibility and diagnostic analysis of distributed resources of the network (e.g., collectors 30, 40 and/or 42) at least by centrally locating log record information associated with the distributed resources and enabling a user to troubleshoot and/or otherwise analyze or manage a distributed resource remote from such resource. Further, embodiments of the present invention enable dynamic responsiveness for evaluating and communicating with various distributed resources by providing a user of system 10 with a manageable resource for accessing information corresponding to the distributed resources. For example, in some embodiments of the present invention, the log NMEs 92 are aggregated, filtered or otherwise processed and stored as aggregated log NMEs 92 (e.g., by origination location, origination time, etc.). Thus, a user of log collector 80 may view and/or otherwise analyze log NMEs 90 and/or 92 associated with a particular collector(s) 30, 40 and/or 42, a particular type of event, events occurring over a desired time frame, or other user-desired criteria. It should be understood that in the method described in FIG. 4, certain functions may be omitted, combined, or accomplished in a sequence different than depicted in FIG. 4. For example, the functions of blocks 404, 406 and 408 of FIG. 4 may be performed in parallel as opposed to serial fashion. Also, it should be understood that the method depicted in FIG. 4 may be altered to encompass any of the other features or aspects described elsewhere in the specification.

What is claimed is:

1. A network usage management system, comprising:
   a plurality of first level collectors adapted to collect network usage data associated with a data source using a network, the first level collectors adapted to generate log data associated with the first level collectors;
   at least one second level collector configured to receive data from the first level collectors, the second level collector further configured to correlate the received data; and
   at least one log collector adapted to retrieve the log data from the first level collectors and the at least one second level collector.

2. The system of claim 1, wherein the log data is associated with a data encapsulator of the first level collectors.

3. The system of claim 1, wherein the log data is associated with a data aggregator of the first level collectors.

4. The system of claim 1, wherein the log data is associated with a data storage system of the first level collectors.

5. The system of claim 1, wherein the first level collectors are adapted to convert a log record into a format usable by the at least one log collector.

6. The system of claim 1, wherein the log data comprises log normalized metered events NMEs.

7. The system of claim 1, wherein the first level collectors are adapted to convert a log record into a log normalized metered event (NME).

8. The system of claim 1, wherein the first level collectors comprise a log encapsulator adapted to convert a log record into a format usable by the at least one log collector.

9. The system of claim 1, wherein the first level collectors comprise a log encapsulator adapted to convert a log record of the at least one collector into a log normalized metered event (NME).

10. The system of claim 1, wherein the first level collectors comprise a log encapsulator adapted to convert a log record of a data encapsulator into a format usable by the first level collectors.

11. The system of claim 1, wherein the first level collectors comprise a log encapsulator adapted to convert a log record of a data aggregator into a format usable by the at least one log collector.

12. The system of claim 1, wherein the first level collectors comprise a log encapsulator adapted to convert a log record of a data storage system into a format usable by the at least one log collector.

13. The system of claim 1, wherein the at least one log collector is adapted to enable a user to analyze the first level collectors using the log data at the at least one log collector.

14. A network usage management method, comprising:
collecting, via at least one second level collector, network usage data associated with a data source using a network, the network usage data being collected from a plurality of first level collectors;
correlating the collected data;
generating, via the at least one second level data collector, log data associated with the at least one collector; and
communicating the log data to at least one log collector.

15. The method of claim 14, wherein generating log data comprises generating log data associated with a data encapsulator of the at least one collector.

16. The method of claim 14, wherein generating log data comprises generating log data associated with a data aggregator of the at least one second level collector.

17. The method of claim 14, wherein generating log data comprises generating log data associated with a data storage system of the at least one second level collector.

18. The method of claim 14, further comprising converting, via the at least one second level collector, a log record into a format usable by the at least one log collector.

19. The method of claim 14, wherein generating log data comprises generating log normalized metered events NMEs.

20. The method of claim 14, further comprising converting, via the at least one second level collector, a log record into a log normalized metered event (NME).

21. The method of claim 14, further comprising converting, via a log encapsulator of the at least one second level collector, a log record of the at least one second level collector into a format usable by the at least one log collector.

22. The method of claim 14, further comprising converting, via a log encapsulator of the at least one second level collector, a log record of the at least one collector into a log normalized metered event (NME).

23. The method of claim 14, further comprising converting, via a log encapsulator of the at least one second level collector, a log record of a data encapsulator into a format usable by the at least one log collector.

24. The method of claim 14, further comprising converting, via a log encapsulator of the at least one second level collector, a log record of a data aggregator into a format usable by the at least one log collector.

25. The method of claim 14, further comprising converting, via a log encapsulator of the at least one second level collector, a log record of a data storage system into a format usable by the at least one log collector.

26. The method of claim 14, further comprising enabling a user to analyze the at least one second level collector using log data at the at least one log collector.

27. A collector of network usage management system, comprising:
a data encapsulator, at a second level collector, the data encapsulator adapted to collect network usage data associated with a data source using a network, at least a portion of the network usage data being collected from a plurality of first level collectors; and
a log encapsulator adapted to convert log data generated by the second level collector into a format usable by a log collector.

28. The collector of claim 27, further comprising a log aggregator adapted to aggregate the log data converted by the log encapsulator.

29. The collector of claim 27, wherein the log encapsulator is adapted to convert a log record generated by the data encapsulator.

30. The collector of claim 27, wherein the log encapsulator is adapted to convert a log record generated by a data aggregator.

31. The collector of claim 27, wherein the log encapsulator is adapted to convert a log record generated by a data storage system.

32. The collector of claim 27, wherein the log encapsulator is adapted to convert a log record of the collector into a log normalized metered event (NME).

33. The collector of claim 27, wherein the log encapsulator is adapted to convert a log record of the data encapsulator into a log normalized metered event (NME).

34. The collector of claim 27, wherein the log encapsulator is adapted to convert a log record of a data aggregator into a log normalized metered event (NME).

35. The collector of claim 27, wherein the log encapsulator is adapted to convert a log record of a data storage system into a log normalized metered event (NME).

* * * * *